Oct. 30, 1945.  D. W. BINGHAM  2,388,036
APPARATUS FOR FILLING CONTAINERS WITH LIQUIDS,
PASTES, OR DISCRETE MATERIAL
Filed May 20, 1941  5 Sheets-Sheet 1

INVENTOR
D. W. BINGHAM
BY
Young Emery & Thompson
ATTYS.

Oct. 30, 1945.  D. W. BINGHAM  2,388,036
APPARATUS FOR FILLING CONTAINERS WITH LIQUIDS,
PASTES, OR DISCRETE MATERIAL
Filed May 20, 1941  5 Sheets-Sheet 2

INVENTOR
D. W. BINGHAM
BY
Young, Emery & Thompson
ATTYS.

INVENTOR
D. W. BINGHAM
BY
Young, Emery &Thompson
ATTYS.

Oct. 30, 1945. D. W. BINGHAM 2,388,036
APPARATUS FOR FILLING CONTAINERS WITH LIQUIDS,
PASTES, OR DISCRETE MATERIAL
Filed May 20, 1941   5 Sheets-Sheet 5

INVENTOR
DAVID W. BINGHAM

BY Young Emery & Thompson
ATTORNEYS

Patented Oct. 30, 1945

2,388,036

UNITED STATES PATENT OFFICE 2,388,036

APPARATUS FOR FILLING CONTAINERS WITH LIQUIDS, PASTES, OR DISCRETE MATERIAL

David William Bingham, Middle Brighton, Victoria, Australia

Application May 20, 1941, Serial No. 394,372
In Australia June 7, 1940

4 Claims. (Cl. 226—99)

This invention relates to apparatus for automatically filling containers with substances such as liquids, pastes or discrete material and has particular reference to apparatus which is adapted for introducing predetermined quantities of such substances into the containers.

According to a prior proposal an endless conveyor is adapted to move the containers to be filled beneath an associated reservoir and filling head. In this known type of machine, the operating mechanism and main supply reservoir are positioned above the conveyor thus causing inconvenience whilst the excessive weight and bulk thereof requires a massive and expensive supporting structure. Furthermore, as the filling head occupies a fixed position, it is necessary to provide means for intermittently moving the conveyor in order that containers carried thereby may be successively positioned beneath the filling head. This known type of apparatus did not prove to be entirely satisfactory in practice in that the delivery of the material into the containers could not be effected with the desired degree of precision, portion of the material being at times deposited upon the conveyor, with the resultant waste of the material, and incomplete filling of containers.

Another known type of apparatus includes a reservoir, a filling nozzle adapted to move in an arcuate path about one of the return ends of a continuously moving endless conveyor and a remotely positioned measuring device associated therewith. In this known machine, the containers are delivered onto the moving conveyor and as each container approaches one of the return ends of the conveyor it passes beneath the filling nozzle which is caused to move in an arcuate path and follow the container around the return end of the conveyor whilst introducing material into the container. In this case it was found that a control valve of the measuring device co-operating with the supply reservoir in being remotely positioned from the filling nozzle, rendered the delivery of the material uncontrollable to the precise degree required, owing to the relatively large quantity of material retained in the delivery pipe or tube between the control valve and the filling nozzle.

One of the objects of the present invention is to provide a simplified form of apparatus for automatically filling containers with liquids, pastes or discrete material whereby a more precise or accurate delivery of measured quantities of such materials from the filling head of the apparatus is obtained.

Another object of the invention is to provide improved apparatus of the kind indicated which is of simplified design in that a minimum number of parts are disposed above an endless conveyor thus providing a compact construction of reduced size and weight as compared with known apparatus of the type before mentioned.

A further object of the invention is to provide, in apparatus of the kind indicated, improved clutch means adapted to ensure synchronization of movement between the various parts of the mechanism employed for effecting delivery of the material into the containers and an endless conveyor carrying said containers.

A still further object of the invention is to provide, in apparatus of the kind indicated, a simple automatic control mechanism associated with a main clutch means whereby the possibility of material being dropped upon the conveyor instead of into a container, is either eliminated or at least reduced to a minimum.

The above and other objects and constructional features of the invention will, however, be more readily apparent from the following description which relates by way of example to one practical embodiment thereof.

Referring to the drawings which form part of this specification—

Figure 1:
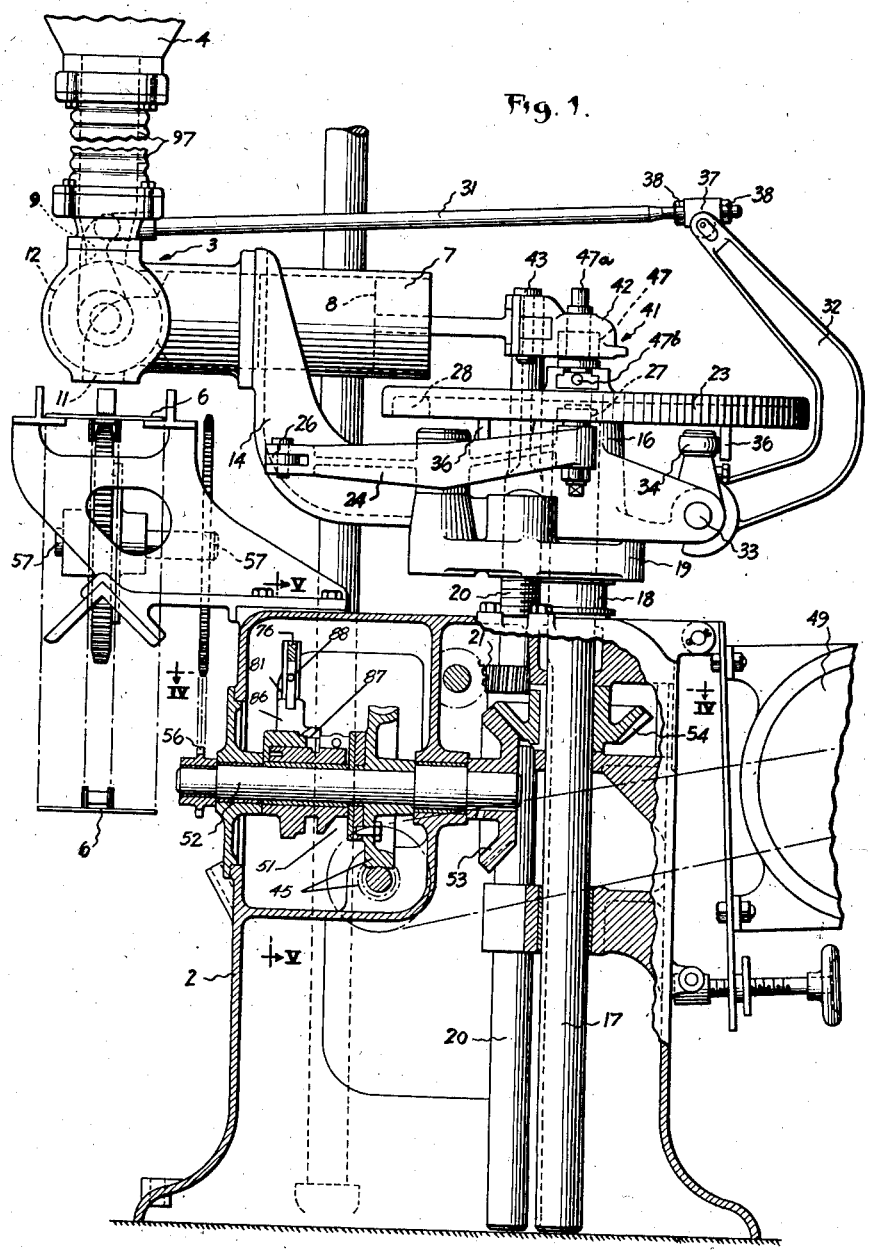
Figure 1 is a part sectional elevation of apparatus for filling containers in accordance with one embodiment of the present invention.

According to the invention, the improved apparatus includes a main supporting frame or casing 2 which also serves as a housing for the driving mechanism hereinafter referred to, a feeding head 3 disposed above the supporting frame, a supply hopper or the like 4 for the feeding head, and an endless conveyor 6 having a substantially straight section and adapted normally to be moved forward uninterruptedly at a substantially constant speed during the filling of containers.

In accordance with the invention the feeding head 3 comprises a cylinder 7 having a piston 8 adapted to reciprocate therein, and inlet and discharge ports 9 and 11 respectively located adjacent to the outer end of the cylinder and associated with a control valve 12 which may be of the oscillatory type in order to open and close the ports as hereinafter described.

The endless conveyor 6 is positioned in close proximity to and immediately beneath the discharge or outlet port 11 of the feeding head and a feature of the invention is the provision in the improved apparatus, of means whereby the feeding head has an oscillatory or a reciprocatory movement imparted thereto in a direction substantially lengthwise of the endless conveyor. The feeding head 3 is thus caused to successively follow each container 13 carried by the conveyor and introduce material into the container whilst it is beneath the feeding head whereupon the latter is returned to its original position for filling the next following container.

The feeding head is preferably supported in a substantially horizontal attitude by a bracket or the like 14 connected to a sleeve 16 which is mounted upon the upper end portion of a main driving shaft 17 upstanding from the supporting frame. A suitable bearing 18 may be positioned between the top of the frame 2 and the sleeve 16.

In order to accommodate different sized containers 13, a means is provided for effecting relative adjustment between the filling head 3 and the conveyor 6. For this purpose the aforesaid bracket 14 and the parts associated therewith may be carried by an adjustable support such as a plate 19 on a plurality of upstanding posts 20 which are slidable lengthwise in bearings 20a on the supporting frame and have screw threads thereon. The posts 20 are formed with screw threads 20b on portions thereof, which threads engage nuts 20c which are capable of rotation but are stationary in the axial direction of the posts. The nuts 20c have external teeth engaging gears 21 on a cross shaft 21a journalled in bearings in the casing 2 and manually rotatable by means of a handwheel 22 thereon, see Figs. 4 and 5.

The means for oscillating the filling head 3 as aforesaid, may comprise a main driving cam 23 connected to the upper end of the main driving shaft 17, and an intermediately pivoted rocker arm 24, one end of which may be connected by a link 26 to one side of the cylinder 7 of the filling head, whilst the opposite end of the rocker arm carries a roller 27 which is adapted to be accommodated within a cam track 28 on the main cam. The rocker arm may be mounted upon the aforesaid plate 19.

During rotation of the main cam 23 the rocker arm 24 is actuated and this causes the filling head 3 to oscillate about the main driving shaft 17. The arrangement is such that the discharge port 11 of the filling head is caused to oscillate along an arcuate path above the conveyor. When the discharge port is located at the front end of this path it registers with a container 13 and moves forward at the same rate as that of the conveyor whilst the container is being filled. The shape of the cam track 28 is such that when the opposite end of the arcuate path is reached the filling head 3 is rapidly returned for filling the next successive container.

Figure 2:
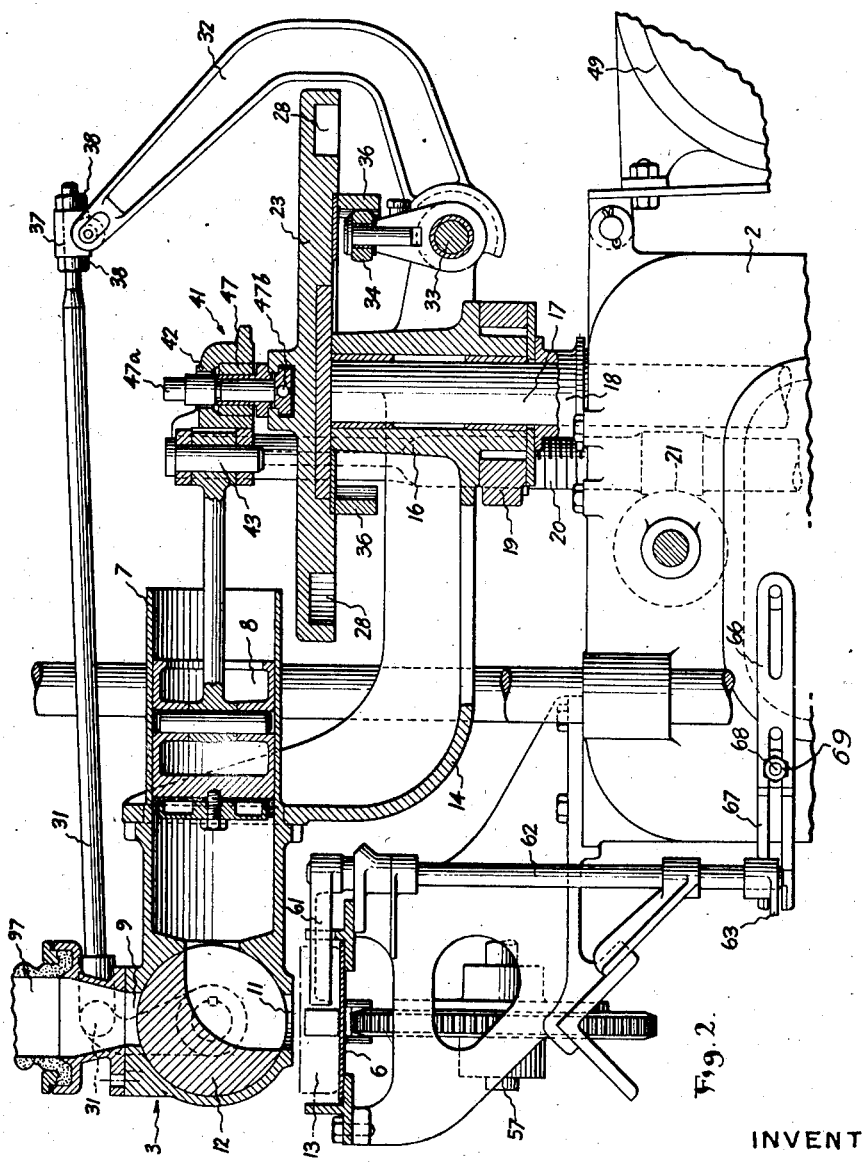
Figure 2 is a sectional elevation on an enlarged scale of a filling head and the parts associated therewith.

The aforesaid inlet and outlet ports 9, 11 and associated control valve 12 of the filling head are located adjacent to the outer end of the cylinder 7 as in Figure 2 of the drawings. The valve 12 is preferably of the oscillatory type and the means for oscillating the valve may consist of a system of cam actuated linkage 31 carried by the cylinder.

The valve actuating means may include a lever arm or crank 32 pivotally mounted as at 33 for instance on the sleeve 16 and a roller 34 adapted to co-operate with one or more cam members 36 on the main cam 23, whereby rotation of the latter causes the lever arm to rock and thus oscillate the valve. If desired two of such cam members 36 may be employed and said pair of cam members may be arranged in such a manner that one cam member engages the roller on one side whilst the other cam member subsequently engages the roller on the other side, thus positively opening and closing the discharge port 11 of the filling head.

As the improved apparatus is adapted for use with materials of widely varied consistencies ranging from say liquids of low viscosity to substances of paste consistency or even granular material, a means may be provided whereby the degree of movement of the valve may be readily controlled. For this purpose, the connections between the lever arm 32 and a connecting rod forming part of the linkage 31 may be of an adjustable character. As indicated in Figure 2, such connection may comprise a sleeve 37 and adjustable nuts 38 so that the effective length of the connecting rod may be varied in accordance with requirements.

Reciprocation of the piston 8 within the cylinder 7 may be effected by a quick-return device 41 carried by the main cam and pivoted to the piston connecting rod. The quick-return device may comprise a slotted arm 42 extending transversely of and pivoted as at 43 to the piston rod, the arm being also pivotally connected as at 44 to the aforesaid stationary plate 19. The slot or guideway 46 formed in the arm is adapted to accommodate a slide member 47 on a crank pin 47a carried by the main cam, rotation of which causes the slide member to describe a circular path and simultaneously reciprocate within the slot whereby the arm 42 oscillates about its pivot 44 and reciprocates the associated piston.

If desired, a screw device 47b or any other suitable means may be employed for varying the effective distance between the crank pin 47a and the cam shaft 17.

Figure 3:
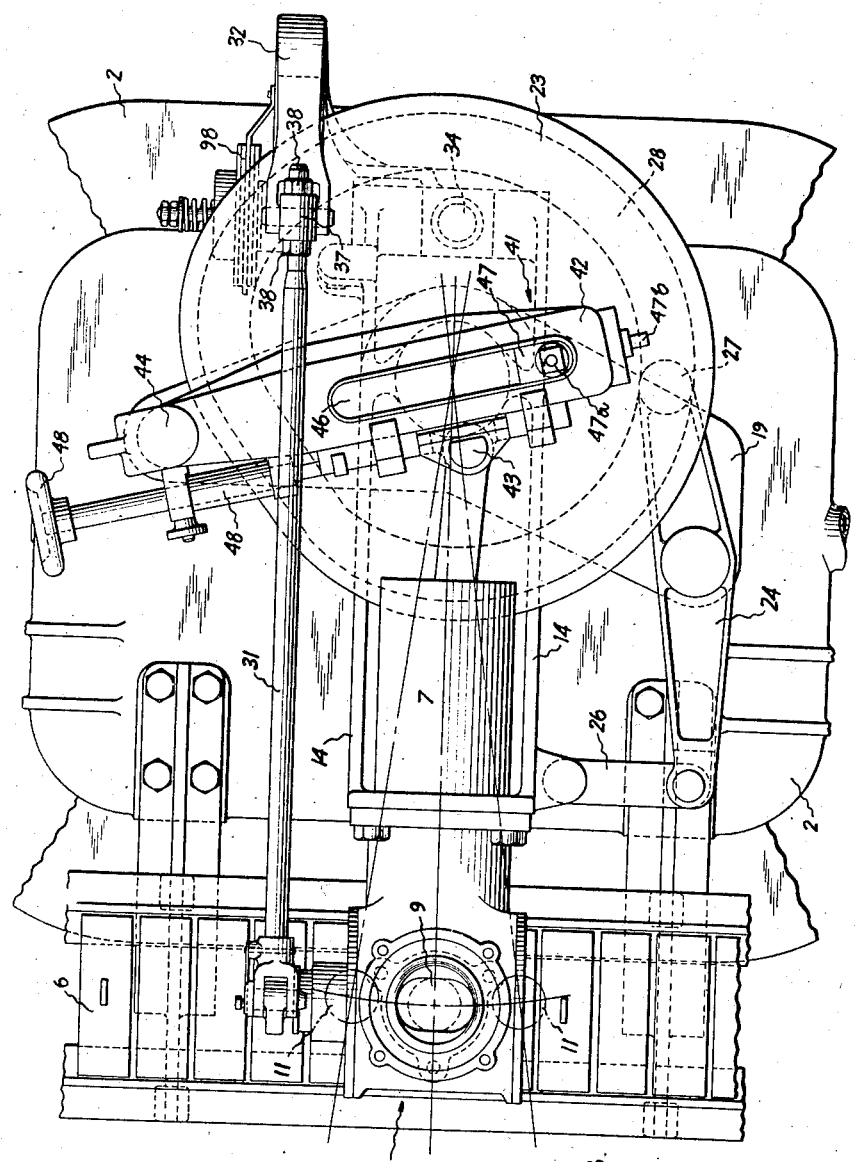
Figure 3 is a fragmentary plan of the parts seen in Figure 2.

In order to regulate the amount of filling material discharged during each forward stroke on the piston 8, a means is provided for varying the effective stroke of the piston in accordance with requirements. Thus the pivotal connection 43 between the piston rod and the slotted arm 42 may be adjustable for example by a screw device 48 as indicated more clearly in Figure 3 of the drawings.

The clutch device 51 is of any suitable striker operated type. For example, the driving clutch member 51a, Fig. 1 and Fig. 4, may be freely mounted upon the shaft 52 and be connected to the larger of the gears 45, while the driven clutch member 51b, Fig. 5, may be slidably keyed to the clutch shaft and engageable by a striker as hereinafter described so that the clutch members may be separated when it is desired to interrupt the drive.

Figure 5:
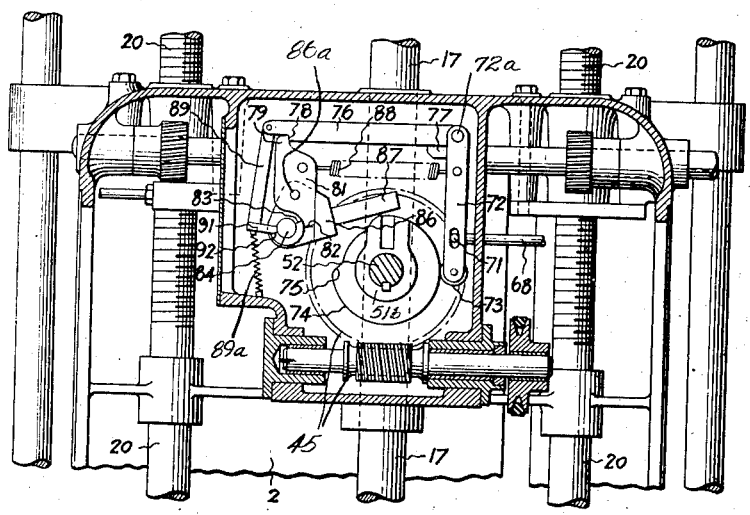
Figure 5 is a sectional elevation taken on the line V—V of Figure 1.
Figure 6:
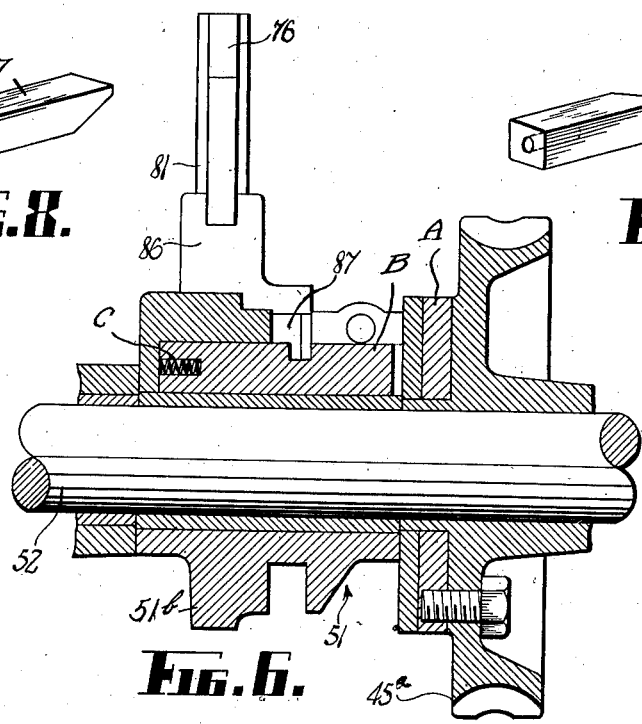
Fig. 6 shows on a larger scale details of a clutch mechanism in the apparatus, in cross-section at VI—VI of Fig. 4.
Figure 7:
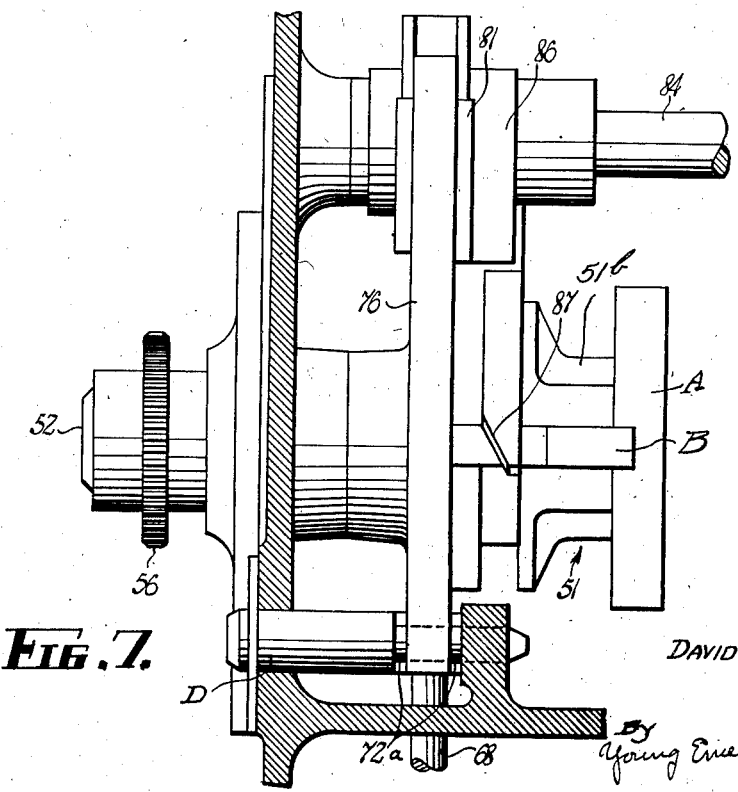
Fig. 7 is an elevational view of the details shown in Fig. 6.

The drive for the main shaft 17 is preferably housed within the supporting casing and may comprise gearing 45, 45a actuated by an electric motor or the like 49 and a container actuated clutch device 51. This clutch is mounted upon a transverse driving or clutch shaft 52 carrying a bevel gear 53 meshing with a similar gear 54 keyed to the main drive shaft 17 in such a manner that the shaft 17 may slide freely through the gear 54 during vertical adjustment of the filling head. The clutch device 51 has a driving clutch member A, Figs. 4, 6 and 7, freely mounted upon the shaft 52 and connected to the worm gear 45a, while the driven clutch member 51b, Fig. 5, is slidably keyed to the clutch shaft 52 and engageable by a striker as hereinafter described so that the clutch members may be separated when it is desired to interrupt the drive. The aforesaid conveyor 6 is also preferably driven from the common clutch shaft 52. For instance, the shaft may be provided with a toothed wheel 56 connected by a chain drive with one of the conveyor shafts 57, thus providing a common drive and synchronism in movement between the forward travel of the conveyor 6, the oscillatory movement of the filler head 3, the reciprocatory movement of the piston 8 within its cylinder 7 and the oscillatory movement of the control valve 12 associated therewith.

In combination with the foregoing, a means is provided for preventing delivery of material from the filler head 3 should a container not be located in its operative position on the conveyor. For this purpose, a clutch actuating means may be associated with the conveyor 6 to automatically actuate the clutch device 51 and stop the machine in accordance with requirements. Said declutching means is also preferably adapted in any suitable manner for manual operation from the exterior of the supporting casing.

The aforesaid automatic clutch actuating means includes a trip cam 61 rotatable by a spring 61a and adapted to be engaged by the spaced containers on the conveyor. A spindle 62 depends from the trip cam and mounted on said spindle is a forked or slotted lever 63 engaging a pin 64 carried by a longitudinally movable slotted bar 66.

Said bar carries a stop-piece 67 and passing through the slot in the bar is a longitudinally movable rod 68 one end of which is located adjacent the stop-piece and has a shoulder, for instance, one or more nuts 69, for engaging the stop while the opposite end of the rod 68 is provided with a pin 71 adapted to slide in a slot formed in a pivoted lever 72 carrying a roller 73 which is adapted to follow a cam track on a clutch cam 74 which is carried by the clutch shaft 52. This cam track has a recessed portion 75 (Fig. 5).

The lever 72 is pivotally connected by a pin 72a at or adjacent to one end to a latch bar 76 pivoted to the machine frame at 72a adapted to be lifted about its pivot by a lug 77 on the lever 72. The opposite end of the latch bar is provided with a recess 78 which is adapted to accommodate a primary shoulder 79 formed on one end of a pivoted trigger plate 81 carried by a block 86 hereinafter referred to, the opposite end of which trigger plate is provided with a secondary shoulder 82 which in turn is adapted to cooperate with a stop 83 on an oscillatable spindle 84 fitted with an operating handle (not shown) which may be employed for manually declutching the driving mechanism.

Figure 8:
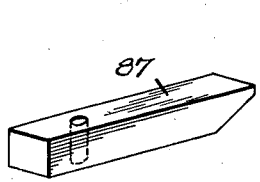
Figs. 8 and 9 are perspective views of elements of the said details.
Figure 9:
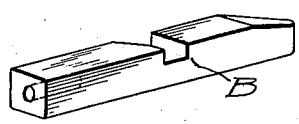

The block 86 is freely mounted on the spindle 84 and has a shoulder adapted to engage the adjacent side edge of the trigger plate 81. This block has a pivot 86a carrying the trigger plate 81 and also carries an outstanding striker 87 (Fig. 8) having a bevelled end cooperating with a drive key B of the clutch device 51 to disengage the drive between the clutch shaft and the main drive shaft 17. The said key B is slidable in a slot formed in the outer face of a driving plate A of the clutch device, see Figs. 6 and 7. The plate A is fast to the worm wheel 45a which is idle on the clutch shaft 52, and spring C urges the key B into engagement with the driving plate A. When the machine is to be stopped because of absence of a can, the nose of the striker 87 enters the slot of the key B and forces it, against the pressure of spring C, to the position shown in Fig. 6, thus declutching the plate A and worm gear 45 from the shaft 52 and disconnecting the drive from the main shaft 17, since the worm gear 45a is loose on the shaft 52.

A tension spring 88 extends between and is connected at its opposite ends to the aforesaid pivoted lever 72 and the pivoted trigger plate 81, said pivoted lever and the trigger plate being disposed at opposite sides of the clutch cam 74. The tension spring tends to hold the roller follower 73 in positive engagement with the clutch cam face and, in addition, maintains the primary shoulder 79 of the trigger plate in the recess 78 formed in the latch bar.

The recessed end of the latch bar 76 also has a spring influenced link 89 pivoted thereto, the opposite end of the link having a laterally extending finger 91 adapted to engage with a second stop 92 on the oscillatable spindle 84. A spring 89a may extend between the link 89 and a part of the machine frame.

In use, containers 13 to be filled are placed on the conveyor 6 in predetermined spaced relationship in such a manner that they extend from the feed end of the conveyor to a position over which the feeding head 3 is at rest, such position being at the forward end of its arcuate movement. When the machine is stationary, the roller follower 73 is in its cam recess 75, the shoulder 79 and recess 78 are disengaged, the shoulder 82 is engaged with the stop 83 and the spring 88 functions to swing the block 86 and its trigger plate 81 bodily about the spindle 84 and thus maintain the striker arm 87 in engagement with the key B of the clutch device 51 for disengaging the clutch.

The machine is now set in operation by swinging the manually operated starting lever so as to partially rotate its associated oscillatable spindle 84 whereby the block 86 and the trigger plate 81 are moved bodily until disengaged from the stop on the oscillatable spindle and the primary shoulder 79 is engaged by the latch bar 76 under the influence of the associated spring 89a, and the shoulder 82 is disengaged from the stop 83. Such movements disengage the striker arm 87 from the key B and permit it to automatically engage the plate A so as to connect the drive gear 45a to the shaft 52 and thereby actuate the conveyor and feeding head in unison.

Figure 4:
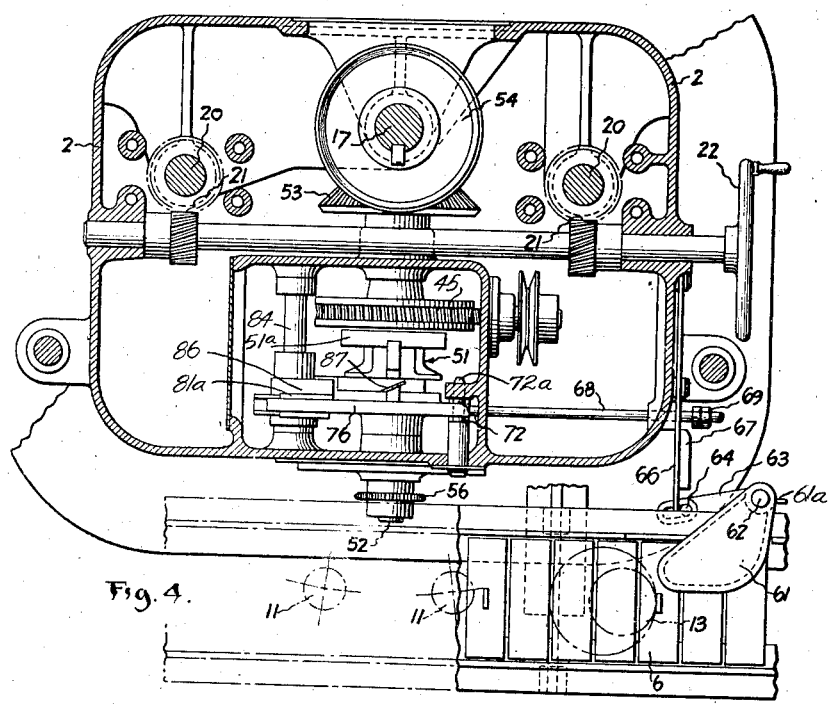
Figure 4 is a sectional plan view taken on the line IV—IV of Figure 1, parts being omitted for convenience of illustration.

While the apparatus continues to operate in the normal manner, the aforesaid trip cam 61 functions to maintain the striker arm 87 out of engagement with the clutch members by reason of the fact that the trip cam is constantly engaged by the passing containers and is thus prevented from returning to its inoperative position across the conveyor as in Fig. 4.

As long as the trip cam is engaged by the containers, it also functions to maintain the roller 73 on the pivoted lever 72 out of engagement with the recessed portion 75 of the clutch cam 74 and thus retain the latch bar 76 in engagement with the trigger plate.

During the forward movement of the conveyor, the outer end portion of the feeding head is swung forward slowly, while maintaining the discharge port 11 in vertical alignment with one of the containers, the control valve 12 having been automatically opened as aforesaid for filling the container during such forward movement of the feeding head.

When the feeding head 3 approaches the limit of its forward movement, the discharge stroke of the piston 8 is completed, whereupon the discharge port 11 is automatically closed and the filling head is rapidly returned to its initial position. During this quick return movement, the piston is retracted for filling the cylinder with a predetermined quantity of the material being delivered to the containers.

It will be appreciated that the effective stroke of the piston may be varied in accordance with the size of the containers being filled simply by adjustment of the aforesaid screw device 48.

In the event, however, of incorrect feeding of containers to the conveyor resulting in the absence of a container from its correct position on the conveyor, the trip cam 61 functions to release the aforesaid stop 67 from engagement with its associated shoulder 69 on the longitudinally movable rod 68 and thus permits the spring 88 to maintain the roller 73 on the pivoted lever 72 in effective engagement with the clutch cam 74 so that during rotation thereof, the roller is free to enter the recess 75 on said cam, and thereby trip the striker arm 87 into engagement with the clutch members. The latter are thereupon automatically disengaged and the machine is stopped.

The tripping mechanism is designed so as to ensure that the filling head occupies its delivery-commencement position when stoppage of the machine takes place as aforesaid. Operation of the apparatus is resumed by manual actuation of the hand lever which rotates its spindle 84 for releasing the declutching striker 87 from the clutch shaft dog or key.

The material supply reservoir or hopper 4 may be remote from the feeding head and connected to the inlet port 9 of the head by a flexible hose or like connection 97. The hopper may have any suitable agitating means associated therewith and in order to permit of the oscillatory movement of the attached feeding head, the flexible hose may be provided with a sinuous section for connection to the feeding head. Such sinuous hose section is of a flexible character so as not to interfere with the swinging movements of the feeding head.

In order to ensure effective opening and closing of the aforesaid discharge port 11 of the feeding head it is desirable to prevent any vibratory or like movement in the operative connections between the oscillatory control valve 12 and its actuating roller 34. For this purpose an adjustable damping device such for example as a series of plate springs and associated washers 98 may be fitted to the spindle 33 so as to hold it steady between its oscillatory movements.

Various modifications, alterations, and/or additions may be incorporated in the foregoing without departing from the spirit and scope of the invention as defined by the appended claims.

Having now described my invention, what I claim as new and desire to secure by Letters Patent is:

1. Apparatus for automatically filling containers with liquids, pastes or discrete material, comprising a supporting frame, a container conveyor carried thereby and movable in a straight line path, an oscillatory feeding head overhanging said conveyor and having a discharge port, a control valve therefor, actuating mechanism for said head, a common support upon which said head and mechanism are mounted so as to form a unitary assembly carried by said supporting frame, means for raising and lowering said assembly bodily in relation to said conveyor, and driving means for operating said conveyor and actuating mechanism in unison, said driving means including an upstanding driving shaft about which the feeding head oscillates in an arcuate path overlapping a portion of the straight line path of the conveyor, a main driving cam on said shaft, said cam having a cam track and a rocker arm on said common support actuated by said cam track and which is operatively connected to said feeding head, said cam track being of such a shape that the operation of the rocker arm thereby will cause the feeding head to move forward at the same speed as the conveyor during feeding of each container and the return movement of the feeding head to be more rapid in order to bring the discharge port into registry with the next following container on the conveyor.

2. Apparatus for automatically filling containers with liquids, pastes or discrete material, comprising a supporting frame, a container conveyor carried thereby and movable in a straight line path, an oscillatory feeding head overhanging said conveyor and having a discharge port, a control valve therefor, actuating mechanism for said head, means for oscillating the feeding head above said conveyor in an arcuate path overlapping a portion of the straight line path of said conveyor, means for automatically actuating said control valve during said oscillatory movements to open the valve for feed of material into the containers during movement of the feeding head in the same direction as the conveyor in said overlapping portion of their paths and to close the valve during the movement of the feeding head in the opposite direction, and driving means for the oscillating means and valve actuating means said driving means including a shaft about which said head oscillates, a cam on said shaft, said cam having a cam track and a rocker arm actuated by said cam track and which is operatively connected to said feeding head, said cam track being of such a shape that the operation of the rocker arm thereby will cause feeding head to move forward at the same speed as the conveyor during feeding of each container and the return movement of the feeding head to be more rapid in order to bring the discharge port into registry with the next following container on the conveyor.

3. Apparatus according to claim 1 in which the feeding head includes a cylinder, a piston and rod reciprocating within said cylinder to discharge material into the containers, means for varying the effective stroke of said piston, and a quick return device for actuating said piston comprising a slotted arm extending transversely of and pivotally connected to the rod of the piston said arm being pivoted at one end on the feeding head and having a longitudinal slot therein, a slide member in said slot, and cam mechanism pivotally connected to said slide member to oscillate said arm.

4. Apparatus according to claim 1 in which the feeding head includes a cylinder, a piston and rod reciprocating within said cylinder to discharge material into the containers, means for varying the effective stroke of said piston, and a quick return device for actuating said piston comprising a slotted arm extending transversely of and pivotally connected to the rod of the piston said arm being pivoted at one end on the feeding head and having a longitudinal slot therein, a slide member in said slot, cam mechanism pivotally connected to said slide member to oscillate said arm, and means for adjusting the pivotal connection between the piston rod and the slotted arm lengthwise of said arm.

DAVID WILLIAM BINGHAM.